(12) United States Patent
Xiao et al.

(10) Patent No.: US 11,758,422 B2
(45) Date of Patent: Sep. 12, 2023

(54) USER EQUIPMENT AND RELATED METHOD

(71) Applicant: SHARP KABUSHIKI KAISHA, Sakai (JP)

(72) Inventors: Fangying Xiao, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/624,268

(22) PCT Filed: Jun. 20, 2018

(86) PCT No.: PCT/CN2018/092029
§ 371 (c)(1),
(2) Date: Dec. 18, 2019

(87) PCT Pub. No.: WO2018/233639
PCT Pub. Date: Dec. 27, 2018

(65) Prior Publication Data
US 2020/0120522 A1   Apr. 16, 2020

(30) Foreign Application Priority Data

Jun. 22, 2017 (CN) .......................... 201710483848.8

(51) Int. Cl.
*H04W 24/08* (2009.01)
*H04W 76/19* (2018.01)
(Continued)

(52) U.S. Cl.
CPC .............. *H04W 24/08* (2013.01); *H04L 1/08* (2013.01); *H04L 41/06* (2013.01); *H04W 36/28* (2013.01);
(Continued)

(58) Field of Classification Search
None
See application file for complete search history.

(56) References Cited

U.S. PATENT DOCUMENTS 9,042,315 B2   5/2015   Lin et al.
2012/0281548 A1   11/2012   Lin et al.
(Continued)

FOREIGN PATENT DOCUMENTS

WO   2014/206489 A1   12/2014

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 12)" 3GPP TS 36.300 V12.5.0 (Mar. 2015).

(Continued)

*Primary Examiner* — Adnan Baig
(74) *Attorney, Agent, or Firm* — ScienBiziP, P.C.

(57) ABSTRACT

The present disclosure provides a method used in user equipment (UE). The method comprises: detecting that a radio link control (RLC) entity associated with a packet duplication bearer or packet duplication split bearer has reached a predetermined maximum number of retransmissions; and determining that a radio link associated with the RLC entity is unavailable or fails based on whether a cell associated with the RLC entity is a special cell (SpCell) or whether a cell group associated with the RLC entity includes an SpCell.

4 Claims, 6 Drawing Sheets

(51) Int. Cl.
    *H04W 76/15*     (2018.01)
    *H04W 76/27*     (2018.01)
    *H04L 1/08*     (2006.01)
    *H04L 41/06*     (2022.01)
    *H04W 36/28*     (2009.01)

(52) U.S. Cl.
    CPC ........... *H04W 76/15* (2018.02); *H04W 76/19* (2018.02); *H04W 76/27* (2018.02)

(56) References Cited

U.S. PATENT DOCUMENTS

| | | | |
|---|---|---|---|
| 2015/0133122 A1* | 5/2015 | Chen | H04W 76/15 455/436 |
| 2016/0057585 A1 | 2/2016 | Horn et al. | |
| 2016/0143003 A1* | 5/2016 | Yi | H04W 76/34 370/329 |
| 2016/0182276 A1* | 6/2016 | Wu | H04W 76/19 370/225 |
| 2016/0242064 A1* | 8/2016 | Lee | H04W 56/0005 |
| 2020/0382431 A1* | 12/2020 | Decarreau | H04L 1/08 |

OTHER PUBLICATIONS

NTT DOCOMO, "New SID Proposal: Study on New Radio Access Technology" 3GPP TSG RAN Meeting #71; RP-160671; Göteborg, Sweden, Mar. 7-10, 2016.

"3rd Generation Partnership Project; Technical Specification Group Radio Access Network; Evolved Universal Terrestrial Radio Access (E-UTRA); Radio Resource Control (RRC); Protocol specification(Release 14)", 3GPP TS 36.331 V14.2.2 (Apr. 2017).

Nokia et al., "Duplication Impacts to RLC", R2-1706549, 3GPP TSG-RAN WG2 NR Adhoc #2, Qingdao, China, Jun. 27-29, 2017.

* cited by examiner

USER EQUIPMENT AND RELATED METHOD

TECHNICAL FIELD

The present disclosure relates to the field of wireless communications technologies. More specifically, the present disclosure relates to user equipment and a method related to a radio link failure.

BACKGROUND

A new research project on 5G technical standards (see non-patent literature: RP-160671: New SID Proposal: Study on New Radio Access Technology) was proposed by NTT DOCOMO at the 3rd Generation Partnership Project (3GPP) RAN #71 plenary meeting held in March 2016, and was approved. The purpose of the research project is to develop a New Radio (NR) access technology to meet all application scenarios, needs, and deployment environments of 5G. NR has three main application scenarios: enhanced mobile broadband communications (Enhanced mobile broadband: eMBB), massive machine type communications (massive Machine type communication: mMTC), and ultra reliable and low latency communications (Ultra reliable and low latency communications: URLLC).

In the 3GPP RAN 2 #96 meeting held in October 2016, it was agreed that research will be performed on multi-connection (including dual-connection) so as to satisfy the reliability requirement of the URLLC. The multi-connection may adopt mechanisms such as packet duplication or link selection. In the 3GPP NR AdHoc meeting held in January 2017, it was agreed that an NR-PDCP entity supports a packet duplication function of a user plane and a control plane, where the function of a PDCP entity at a transmission end is to support packet duplication, while the function of a PDCP entity at a receiving end is to support deletion of duplicate packets. In the 3GPP RAN 2 #97 meeting held in February 2017, it was agreed that both uplink and downlink support that in carrier aggregation, packet duplication uses a Packet Data Convergence Protocol (PDCP) packet data unit (PDU) and/or service data unit (SDU) for transmission on two or more logical channels and causes duplicate PDCP PDUs to be transmitted through different carriers. In the 3GPP RAN 2 #98 meeting held in April 2017, it was agreed that in radio resource control (RRC) configuration, two duplicate logical channels are mapped to different carriers, that is, duplicate logical channels cannot be mapped to the same carrier.

It is expected to solve problems related to a radio link failure in carrier aggregation and multi-connection scenarios supporting packet duplication.

SUMMARY OF INVENTION

According to a first aspect of the present invention, a method used in user equipment (UE) is provided, the method comprising: detecting that a radio link control (RLC) entity associated with a packet duplication bearer or packet duplication split bearer has reached a predetermined maximum number of retransmissions; and determining that a radio link associated with the RLC entity is unavailable or fails based on whether a cell associated with the RLC entity is a special cell (SpCell) or whether a cell group associated with the RLC entity comprises an SpCell.

In an embodiment, the RLC entity is associated with the packet duplication bearer, and the determining comprises: determining that the radio link associated with the RLC entity is unavailable when the cell associated with the RLC entity is not the special cell (SpCell) or the cell group associated with the RLC entity does not comprise the SpCell. Alternatively, it is determined that the radio link associated with the RLC entity fails when the cell associated with the RLC entity is the special cell (SpCell) or the cell group associated with the RLC entity comprises the SpCell.

In an embodiment, the RLC entity is used for a master cell group (MCG) or secondary cell group (SCG) packet duplication bearer, the special cell is a primary cell (PCell) of an MCG or a primary secondary cell (PSCell) of an SCG, and the determining comprises: determining that a radio link associated with the MCG is unavailable when the cell associated with the RLC entity for the MCG packet duplication bearer is not the PCell or the cell group associated with the RLC entity does not comprise the PCell, or determining that a radio link associated with the SCG is unavailable when the cell associated with the RLC entity for the SCG packet duplication bearer is not the PSCell or the cell group associated with the RLC entity does not comprise the PSCell. Alternatively, it is determined that an MCG radio link fails when the cell associated with the RLC entity for the MCG packet duplication bearer is the primary cell (PCell) or the cell group associated with the RLC entity comprises the PCell, or it is determined that an SCG radio link fails when the cell associated with the RLC entity for the SCG packet duplication bearer is the primary secondary cell (PSCell) or the cell group associated with the RLC entity comprises the PSCell.

In an embodiment, the RLC entity is used for an MCG or SCG packet duplication split bearer, the special cell is a PCell of an MCG or a PSCell of an SCG, and the determining comprises: determining that an MCG radio link fails when the cell associated with the RLC entity for the MCG packet duplication split bearer is the PCell or the cell group associated with the RLC entity comprises the PCell. Alternatively, it is determined that a radio link associated with the MCG is unavailable when the cell associated with the RLC entity for the MCG packet duplication split bearer is a secondary cell (SCell) or the cell group associated with the RLC entity does not comprise the PCell. It is determined that an SCG radio link fails when the cell associated with the RLC entity for the SCG packet duplication split bearer is the PSCell or the cell group associated with the RLC entity comprises the PSCell. It is determined that a radio link associated with the SCG is unavailable when the cell associated with the RLC entity for the SCG packet duplication split bearer is the SCell or the cell group associated with the RLC entity does not comprise the PSCell.

In an embodiment, the RLC entity is used for an MCG or SCG packet duplication bearer, wherein when it is detected that all RLC entities associated with the MCG or SCG packet duplication bearer have reached the predetermined maximum number of retransmissions, the determining comprises: determining that an MCG or SCG radio link fails. Alternatively, the RLC entity is used for an MCG or SCG packet duplication split bearer, wherein when it is detected that all RLC entities associated with the MCG or SCG packet duplication split bearer have reached the predetermined maximum number of retransmissions, the determining comprises: determining that MCG and SCG radio links fail.

In an embodiment, when it is determined that the radio link associated with the RLC entity is unavailable, the method further comprises: deactivating Packet Data Convergence Protocol (PDCP) packet duplication, and transmitting a PDCP protocol data unit (PDU) to another RLC entity different from the RLC entity in RLC entities used in the PDCP packet duplication, without triggering radio resource control (RRC) connection reestablishment caused by a radio link failure; or suspending the packet duplication bearer or packet duplication split bearer corresponding to the RLC entity.

In an embodiment, the deactivating PDCP packet duplication is performed on a PDCP layer in response to an indication that the RLC entity has reached the predetermined maximum number of retransmissions. Alternatively, the deactivating PDCP packet duplication is performed on an RRC layer in response to an indication that the RLC entity has reached the predetermined maximum number of retransmissions, or the suspending the packet duplication bearer or packet duplication split bearer corresponding to the RLC entity is performed on the RRC layer in response to an indication that the RLC entity has reached the predetermined maximum number of retransmissions.

In an embodiment, the method further comprises: transmitting an indication message to a base station through RRC signaling to indicate that a radio link is unavailable.

In an embodiment, the indication message further indicates a cell or cell group corresponding to the unavailable radio link.

According to a second aspect of the present invention, user equipment (UE) is provided, comprising a transceiver, a processor, and a memory, the processor storing instructions executable by the processor so that the UE performs the method according to the aforementioned first aspect.

BRIEF DESCRIPTION OF DRAWINGS

The above and other features of the present disclosure will become more apparent with the following detailed description in conjunction with the accompanying drawings.

DETAILED DESCRIPTION OF EMBODIMENTS

Figure 1:
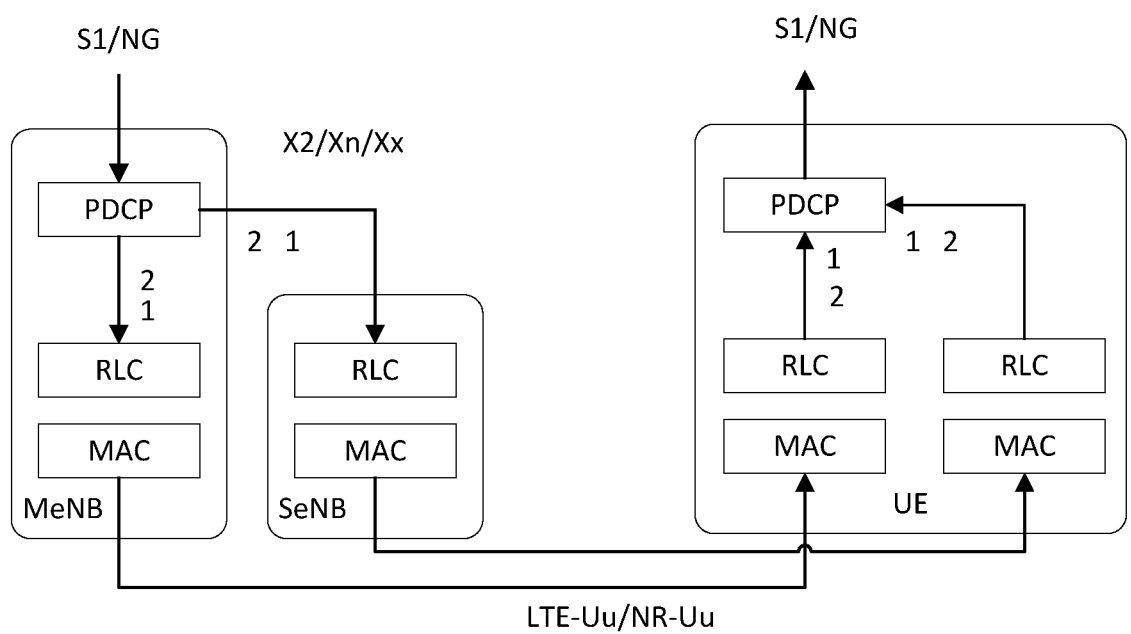
FIG. 1 is a schematic diagram illustrating data transmission of an MCG packet duplication split DRB.

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

Some terms involved in the present disclosure are described below. If not specifically indicated, the terms involved in the present disclosure use the definitions herein. The terms given in the present disclosure may be named differently in NR, LTE, and eLTE, but unified terms are used in the present disclosure. When applied to a specific system, the terms may be replaced with terms used in the corresponding system.

RRC: Radio Resource Control.

PDCP: Packet Data Convergence Protocol. In the present disclosure, if not specifically indicated, the PDCP may be a PDCP in NR or LTE or eLTE.

RLC: Radio Link Control. In the present disclosure, if not specifically indicated, the RLC may be RLC in NR or LTE or eLTE. An RLC entity may be an unacknowledged mode (UM) RLC entity or an acknowledged mode (AM) RLC entity.

MAC: Medium Access Control. In the present disclosure, if not specifically indicated, the MAC may be MAC in NR or LTE or eLTE.

DTCH: Dedicated Traffic Channel.

CCCH: Common Control Channel.

DCCH: Dedicated Control Channel.

PDU: Protocol Data Unit.

SDU: Service Data Unit.

In the present disclosure, data received from or transmitted to an upper layer is referred to as an SDU, and data transmitted to or received from a lower layer is referred to as a PDU. For example, data received from or transmitted to an upper layer by a PDCP entity is referred to as a PDCP SDU; data received from or transmitted to an RLC entity by the PDCP entity is referred to as a PDCP PDU (namely, an RLC SDU).

Master base station: Master eNB, denoted as MeNB (base station corresponding to E-UTRAN or LTE or eLTE) or MgNB (base station corresponding to 5G-RAN or NR). The master base station is a base station that at least terminates at a mobility management entity (which may be denoted as S1-MME) as a control node for processing interaction between UE and a core network in multi-connection. In the present disclosure, master base stations are all denoted as MeNBs. It should be noted that all embodiments or definitions applicable to the MeNB are also applicable to the MgNB.

Secondary base station: Secondary eNB, denoted as SeNB (base station corresponding to E-UTRAN or LTE or eLTE) or SgNB (base station corresponding to 5G-RAN or NR). The secondary base station is a base station that provides additional radio resources for UE but does not serve as an MeNB in multi-connection. In the present disclosure, secondary base stations are all denoted as SeNBs. It should be noted that all embodiments or definitions applicable to the SeNB are also applicable to the SgNB.

Primary cell: Primary Cell, PCell. The PCell is a cell that operates on the primary frequency, and is a cell on which UE performs an initial connection establishment procedure or initiates a connection reestablishment procedure or which is designated as a primary cell during a handover procedure. The cell in the present disclosure may also be referred to as a carrier.

Primary secondary cell: Primary Secondary Cell, PSCell. an SCG cell in which UE is instructed to perform random access when performing the SCG change procedure.

Secondary cell: Secondary Cell, SCell. The SCell is a cell operating on the secondary frequency. The cell may be configured once an RRC connection is established and may be used to provide additional radio resources.

Cell group: Cell Group, CG. The CG is a group of serving cells or carriers associated with a master base station or secondary base station. In the present disclosure, a group of cells associated with a certain logical channel or RLC entity of a packet duplication bearer or a group of cells providing radio resources or data transmission services to a certain logical channel or RLC entity of a packet duplication bearer is referred to as a cell group, where the cell may be a cell provided with an uplink carrier. The cell may also be referred to as a serving cell. It should be noted that the cell in the present disclosure may also be referred to as a set of beams.

Master cell group: Master Cell Group, MCG. For a UE not configured with multi-connection, the MCG comprises all serving cells; for a UE configured with multi-connection, the MCG comprises a subset of serving cells (namely, a group of serving cells associated with an MeNB or MgNB) comprising of a PCell and 0, 1, or more SCells.

Secondary cell group: Secondary Cell Group, SCG. The SCG is a group of serving cells associated with an SeNB or SgNB in multi-connection. The SCG may include one PSCell, and may further include one or more SCells.

Special cell: SpCell. The SpCell is a PCell of an MCG or a PSCell of an SCG in multi-connection; the SpCell is a PCell in carrier aggregation and single-connection.

Multi-connection: an operation mode of UE in an RRC connected state. In the multi-connection, multiple cell groups are configured, and the multiple cell groups include one MCG and one or more SCGs (that is, the UE is connected to multiple base stations). If only one MCG (or MeNB or MgNB) and one SCG (or SeNB or SgNB) are configured, the multi-connection is referred to as dual-connection. That is, the UE in the connected state and having multiple receivers and/or transmitters is configured to use EUTRAN and/or 5G-RAN radio resources provided by multiple different schedulers; the schedulers may be connected by non-ideal backhaul or ideal backhaul. The multi-connection in the present disclosure includes dual-connection. Multi-connection data transmission modes include, but are not limited to, packet duplication and link selection.

DRB: Data Radio Bearer carrying user plane data, also referred to as a data bearer for short.

SRB: Signaling Radio Bearer. The bearer may be used for transmitting an RRC message and a NAS message or for transmitting only an RRC message and a NAS message. The SRB may include SRB0, SRB1, SRB1bis, and SRB2. SRB0 is used for an RRC message using a CCCH logical channel; SRB1 is used for an RRC message using a DCCH logical channel, where the RRC message may include a NAS message; SRB1 is further used for transmitting a NAS message before SRB2 is established. SRB1bis is used for an RRC message and a NAS message using a DCCH logical channel prior to security activation, where the RRC message may include a NAS message. SRB2 is used for an RRC message and a NAS message using a DCCH logical channel, where the RRC message includes recorded measurement information (or referred to as a measurement log). The SRB may be an MCG SRB or an SCG SRB. The bearer in the present disclosure may be a DRB or an SRB.

Split DRB: a bearer whose wireless protocol is located in both MeNB (or MgNB) and SeNB (or SgNB) and which uses resources of both the MeNB (or MgNB) and the SeNB (or SgNB) in multi-connection. If a PDCP entity of the split DRB is located in a master base station (that is, data arrives at the master base station first and is forwarded by the master base station to a secondary base station to split the data in the master base station), the split DRB is referred to as an MCG split DRB; if a PDCP entity of the split DRB is located in a secondary base station (that is, data arrives at the secondary base station first and is forwarded by the secondary base station to a master base station to split the data in the secondary base station), the split DRB is referred to as an SCG split DRB. If not specifically indicated, the split DRB in the present disclosure may be an MCG split DRB or an SCG split DRB. The embodiment of the present disclosure is also applicable to scenarios in which an MCG split DRB and an SCG split DRB are not distinguished, namely, the split DRB is a bearer DRB of which a wireless protocol is located in an MeNB (or MgNB) and an SeNB (or SgNB) and which uses resources of both the MeNB (or MgNB) and the SeNB (or SgNB).

Split SRB: a bearer of which a wireless protocol is located in an MeNB (or MgNB) and an SeNB (or SgNB) and which uses resources of both the MeNB (or MgNB) and the SeNB (or SgNB) in multi-connection. If a PDCP entity and/or RRC of the split SRB is located in a master base station (that is, signaling, also referred to as data, is forwarded by the master base station to a secondary base station to split the signaling in the master base station), the split SRB is referred to as an MCG split SRB; if a PDCP entity and/or RRC of the split SRB is located in a secondary base station (that is, signaling, also referred to as data, is forwarded by the secondary base station to a master base station to split the signaling in the secondary base station), the split SRB is referred to as an SCG split SRB. If not specifically indicated, the split SRB in the present disclosure may be an MCG split SRB or an SCG split SRB. The embodiment of the present disclosure is also applicable to scenarios in which an MCG split SRB and an SCG split SRB are not distinguished, namely, the split SRB is a bearer SRB of which a wireless protocol is located in an MeNB (or MgNB) and an SeNB (or SgNB) and which uses resources of both the MeNB (or MgNB) and the SeNB (or SgNB). In the present disclosure, the split bearer may be a split SRB or a split DRB.

Packet duplication: also referred to as data duplication or packet duplication or PDCP duplication or PDCP PDU duplication or PDCP SDU duplication or PDCP packet duplication (If not specifically indicated, the data in the present disclosure may be control plane signaling or user plane data, which respectively correspond to signaling of an SRB and data of a DRB). In a multi-connection mode, the same data (or referred to as packet, namely, PDCP PDU or PDCP SDU) is transmitted in serving cells of multiple CGs, that is, the same data is transmitted simultaneously using resources provided by a master base station (or an MCG) and a secondary base station (or an SCG) or the same data is transmitted to a lower layer (or an RLC layer) of an MCG and an SCG respectively, or a PDCP entity transmits the same PDCP PDU to multiple associated lower-layer entities (or RLC entities), or the same data is transmitted on multiple different bearers. In a carrier aggregation or single-connection mode, a PDCP entity transmits duplicate (or the same) PDCP PDUs to two or more associated RLC entities (or referred to as lower-layer entities) and/or logical channels, and a MAC entity transmits the PDCP PDUs to a receiving end through different carriers (also referred to as cells or serving cells); a PDCP entity at the receiving end is responsible for detection and deletion of the duplicate PDCP PDUs or SDUs.

Packet duplication bearer: a bearer supporting packet duplication, including a packet duplication SRB and a packet duplication DRB. One PDCP entity of the bearer is associated with two or more RLC entities, two or more logical channels, and one MAC entity; a PDCP entity at a transmission end transmits duplicate (or the same) PDCP PDUs to the two or more RLC entities (or referred to as lower-layer entities) and/or two or more logical channels, and a MAC entity transmits the PDCP PDUs to a receiving end through different carriers (namely, cells or serving cells); a PDCP entity at the receiving end de-duplicates the PDCP PDUs or SDUs from the lower-layer entities. A packet duplication bearer of which a wireless protocol is located in an MeNB and which uses only resources of the MeNB is an MCG packet duplication bearer; a packet duplication bearer of which a wireless protocol is located in an SeNB and which uses only radio resources of the SeNB is referred to as an SCG packet duplication bearer. If not specifically indicated, the packet duplication bearer in the present disclosure may be an MCG packet duplication bearer or an SCG packet duplication bearer.

Packet duplication split bearer: a split bearer supporting packet duplication in a multi-connection mode. In the transmission mode, the same data is transmitted on multiple wireless protocols of the split bearer, including an MCG packet duplication split SRB, an SCG packet duplication split SRB, an MCG packet duplication split DRB, and an SCG packet duplication split DRB. If the packet duplication split bearer is an MCG packet duplication split bearer, a PDCP entity located in a master base station or MCG is responsible for packet duplication and/or packet de-duplication; if the packet duplication split bearer is an SCG packet duplication split bearer, a PDCP entity located in a secondary base station or SCG is responsible for packet duplication (that is, transmitting PDCP PDUs to two or more RLC entities) and/or packet de-duplication.

FIG. 1 is a schematic diagram illustrating downlink transmission of an MCG packet duplication split DRB between a base station and user equipment (UE) in dual-connection. It should be understood that uplink transmission of the MCG packet duplication split DRB between the base station and the UE can adopt the same protocol architecture, except that data is transmitted from the UE to the base station, that is, the arrows in FIG. 1 are reversed. As shown in FIG. 1, data (for example, a Packet Data Convergence Protocol protocol data unit (PDCP PDU)) is transmitted on multiple wireless protocols (corresponding to multiple RLC entities associated with the same PDCP entity) of the split DRB by using resources of an MeNB and an SeNB. In a PDCP PDU data duplication multi-connection mode, each PDCP PDU is transmitted to a receiving party through multiple RLC entities. An interface between the MeNB and the SeNB may be denoted as Xn or Xx or X2. The interface may be named differently according to different types of the MeNB and the SeNB. For example, the interface is denoted as Xx if the MeNB is an LTE eNB and the SeNB is a gNB; the interface is denoted as Xn if the MeNB is a gNB and the SeNB is an eLTE eNB. Accordingly, an MCG packet duplication split SRB adopts a similar protocol architecture, and the difference lies in that an upper-layer entity transmitting data to a PDCP entity is RRC, and the PDCP entity receives data from a lower-layer entity and then transmits the data to the RRC entity on the upper layer.

Figure 2:
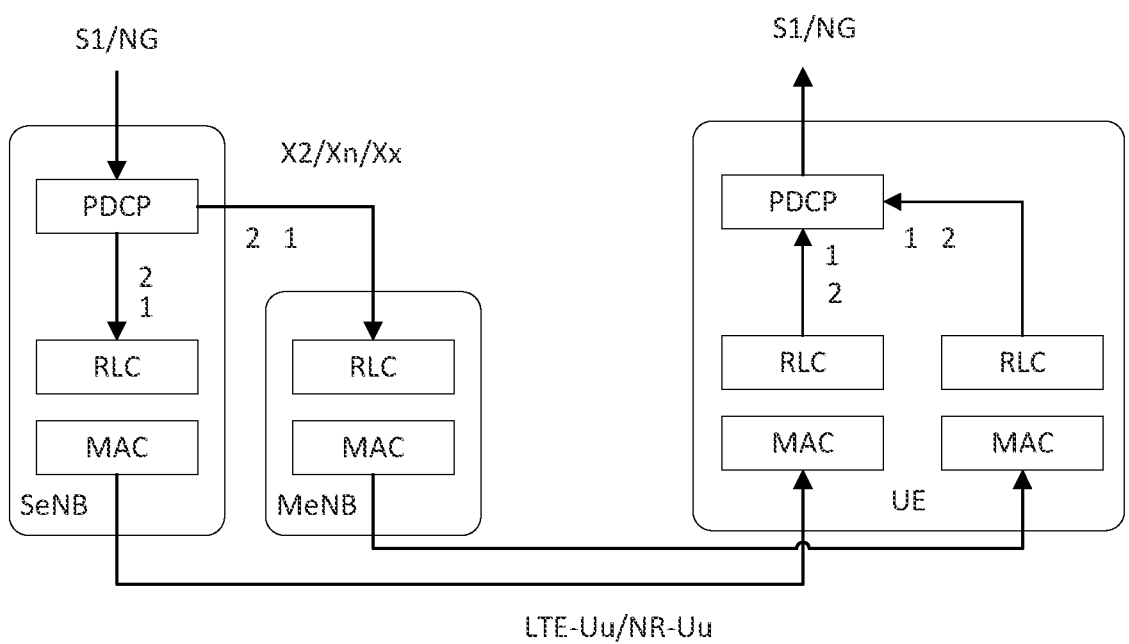
FIG. 2 is a schematic diagram illustrating data transmission of an SCG packet duplication split DRB.

FIG. 2 is a schematic diagram illustrating downlink transmission of an SCG packet duplication split DRB between a base station and user equipment (UE) in dual-connection. It should be understood that uplink transmission of the SCG packet duplication split DRB between the base station and the UE can adopt the same protocol architecture, except that data is transmitted from the UE to the base station, that is, the arrows in FIG. 2 are reversed. As shown in FIG. 2, data (for example, a Packet Data Convergence Protocol protocol data unit (PDCP PDU)) is transmitted on multiple wireless protocols (corresponding to multiple RLC entities associated with the same PDCP entity) of the split DRB by using resources of an MeNB and an SeNB. In a PDCP PDU data duplication multi-connection mode, each PDCP PDU is transmitted to a receiving party through multiple RLC entities. An interface between the MeNB and the SeNB may be denoted as Xn or Xx or X2. The interface may be named differently according to different types of the MeNB and the SeNB. For example, the interface is denoted as Xx if the MeNB is an LTE eNB and the SeNB is a gNB; the interface is denoted as Xn if the MeNB is a gNB and the SeNB is an eLTE eNB. Accordingly, an SCG packet duplication split SRB adopts a similar protocol architecture, and the difference lies in that an upper-layer entity transmitting data to a PDCP entity is RRC, and the PDCP entity receives data from a lower-layer entity and then transmits it to the RRC entity on the upper layer.

Some embodiments of the present disclosure use repeatedly transmitting a data packet PDCP PDU or SDU twice as an example (that is, one PDCP entity is associated with two RLC entities and/or two logical channels). However, the technical solution in the present disclosure is not limited to the scenarios of repeatedly transmitting a data packet PDCP PDU or SDU twice, and those skilled in the art can easily expand the technical solution to scenarios of repeatedly transmitting a data packet many times (that is, one PDCP entity is associated with multiple RLC entities and/or multiple logical channels).

Figures 3A, 3B:
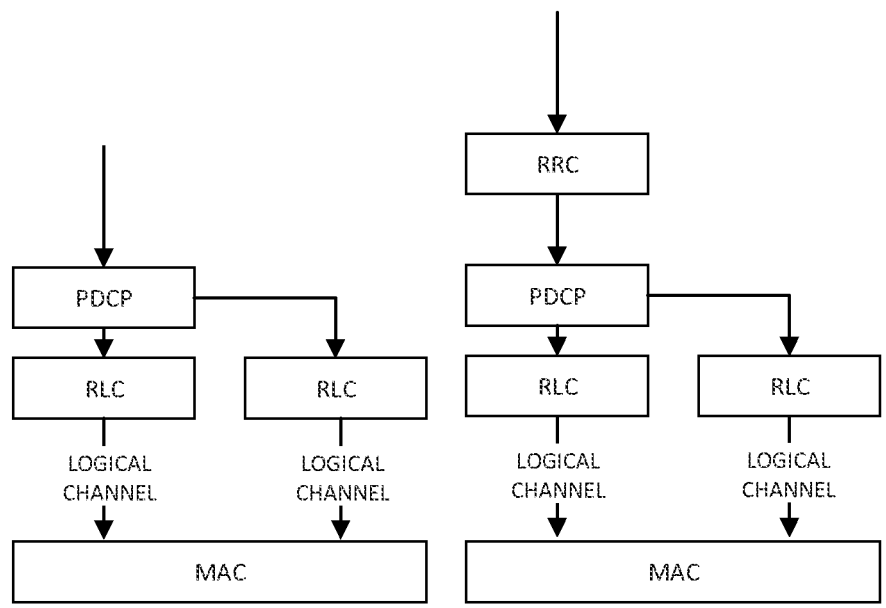
FIG. 3 is a schematic diagram of a protocol architecture of a packet duplication bearer in a carrier aggregation scenario.

FIG. 3 is a schematic diagram of a protocol architecture of a packet duplication bearer in a carrier aggregation scenario. In the schematic diagram shown in FIG. 3(a), a PDCP entity of a DRB is associated with two RLC entities and two logical channels, and one MAC entity. In the schematic diagram shown in FIG. 3(b), an RRC entity and a PDCP entity of an SRB are associated with two RLC entities and two logical channels, and one MAC entity.

Figures 4A, 4B:
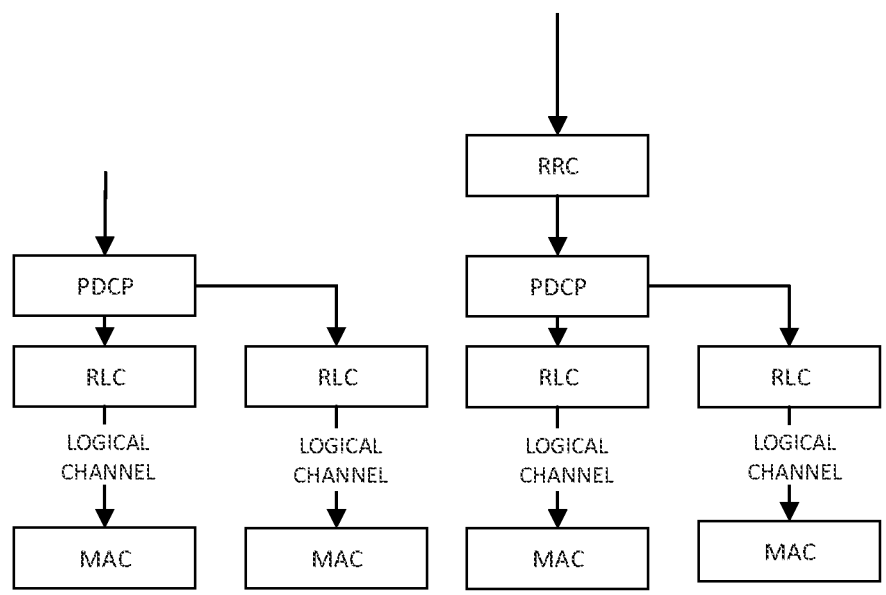
FIG. 4 is a schematic diagram of a protocol architecture of a packet duplication bearer in a dual-connection scenario.

FIG. 4 is a schematic diagram of a protocol architecture of a packet duplication bearer in a dual-connection scenario. In the schematic diagram shown in FIG. 4(a), a PDCP entity of a DRB is associated with two RLC entities and two logical channels, and two MAC entities. In the schematic diagram shown in FIG. 4(b), an RRC entity and a PDCP entity of an SRB are associated with two RLC entities and two logical channels, and two MAC entities.

According to FIGS. 3 and 4, RLC entities are in a one-to-one correspondence with logical channels, and in the embodiment of the present invention, a cell or cell group associated with an RLC entity is the same as a cell or cell group associated with a logical channel. Therefore, in the embodiment of the present invention, the description of a cell or cell group associated with an RLC entity and the description of a cell or cell group associated with a logical channel are replaceable with each other.

In an existing system (version 14), for an AM RLC entity, if the number of retransmissions RETX_COUNT of an acknowledged mode data (AM Data) AMD PDU or a part of the AMD PDU reaches a maximum number of retransmissions maxRetxThreshold configured by the network, an indication is transmitted to an upper layer (namely, an RRC layer) to indicate that the maximum number of retransmissions has been reached. For an SRB or MCG DRB or split DRB, when the RRC layer receives an indication, from the MCG RLC, that the maximum number of retransmissions has been reached, it is considered that a radio link failure (RLF) of an MCG is detected and radio link failure-related information is stored in a radio link failure information element VarRLF-Report: if access stratum (AS) security is not activated at this time, a relevant operation of leaving RRC_CONNECTED is performed; if AS security is activated at this time, a connection reestablishment procedure is started. For an SCG DRB or split DRB, when the RRC layer receives an indication, from the SCG RLC, that the maximum number of retransmissions has been reached, it is considered that a radio link failure of an SCG (SCG-RLF) is detected and an SCG failure information procedure is started to report the SCG radio link failure. The maximum number of retransmissions is used for the transmitting side of the AM RLC entity to limit the number of retransmissions of an AMD PDU.

Embodiments of the present disclosure are described below in view of the issues related to a radio link failure in a packet duplication scenario.

Figure 5:
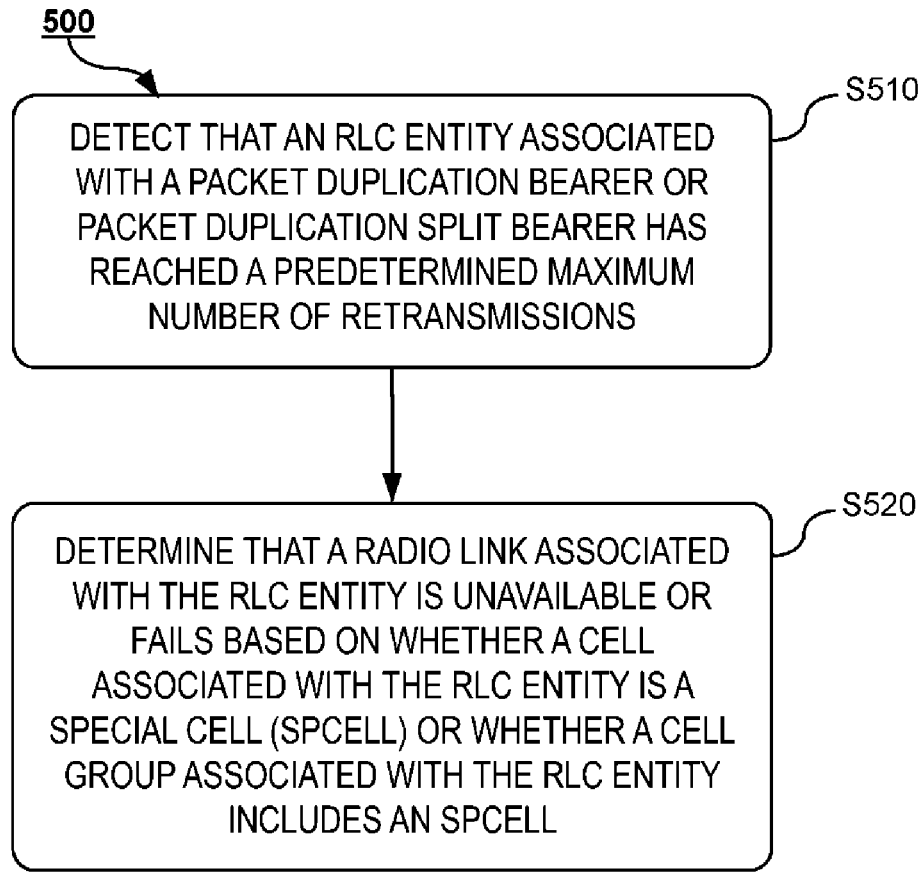
FIG. 5 is a flowchart of a method used in user equipment according to an embodiment of the present disclosure.

FIG. 5 is a flowchart of a method 500 used in user equipment according to an embodiment of the present disclosure. The method 500 includes the following steps.

Step S510: detect that a radio link control (RLC) entity associated with a packet duplication bearer or packet duplication split bearer has reached a predetermined maximum number of retransmissions.

In the context of the present disclosure, the RLC entity associated with the packet duplication bearer or packet duplication split bearer is sometimes described as an RLC entity corresponding to a logical channel associated with the packet duplication bearer or packet duplication split bearer. Since logical channels are in a one-to-one correspondence with RLC entities in the packet duplication scenario, in the context of the present disclosure, "associated with the logical channel" and "associated with the RLC entity" have the same meaning and can be used interchangeably.

Step S520: determine that a radio link associated with the RLC entity (or corresponding logical channel) is unavailable or fails based on whether a cell associated with the RLC entity (or corresponding logical channel) is a special cell (SpCell) or whether a cell group associated with the RLC entity (or corresponding logical channel) includes an SpCell.

In the context of the present disclosure, the radio link associated with the RLC entity (or corresponding logical channel) being unavailable or failing is sometimes described as a cell or cell group associated with the RLC entity (or corresponding logical channel) being unavailable or failing. They have the same meaning and can be used interchangeably.

In the context of the present disclosure, if access stratum (AS) security is not activated, the radio link "failing" will cause a relevant operation of leaving RRC_CONNECTED to be performed; if AS security is activated, the radio link "failing" will cause radio resource control (RRC) connection reestablishment; if AS security is activated, the radio link "being unavailable" may not trigger RRC connection reestablishment caused by a radio link failure or the radio link "being unavailable" may trigger an RRC layer to suspend the packet duplication bearer or packet duplication split bearer corresponding to the RLC entity.

Specific examples of the method 500 are described below according to the bearer type.

RLC Entity is Associated with Packet Duplication Bearer

In this case, in step S520, it is determined that the radio link associated with the RLC entity is unavailable when the cell associated with the RLC entity is not the special cell (SpCell) or the cell group associated with the RLC entity does not include the SpCell. Alternatively, it is determined that the radio link associated with the RLC entity fails when the cell associated with the RLC entity is the special cell (SpCell) or the cell group associated with the RLC entity includes the SpCell.

Specifically, the RLC entity is used for a master cell group (MCG) or secondary cell group (SCG) packet duplication bearer, and the special cell is a primary cell (PCell) of an MCG or a primary secondary cell (PSCell) of an SCG.

In step S510, it is determined that a radio link associated with the MCG is unavailable or it is determined that the cell or cell group associated with the RLC is unavailable or it is determined that the radio link corresponding to the RLC is unavailable when the cell associated with the RLC entity for the MCG packet duplication bearer is not the PCell or the cell group associated with the RLC entity does not include the PCell, or it is determined that a radio link associated with the SCG is unavailable or it is determined that the cell or cell group associated with the RLC is unavailable or it is determined that the radio link corresponding to the RLC is unavailable when the cell associated with the RLC entity for the SCG packet duplication bearer is not the PSCell or the cell group associated with the RLC entity does not include the PSCell.

Alternatively, in step S510, it is determined that an MCG radio link fails when the cell associated with the RLC entity for the MCG packet duplication bearer is the primary cell (PCell) or the cell group associated with the RLC entity includes the PCell, or it is determined that an SCG radio link fails when the cell associated with the RLC entity for the SCG packet duplication bearer is the primary secondary cell (PSCell) or the cell group associated with the RLC entity includes the PSCell.

Specifically, for a UE configured with a packet duplication bearer, if a cell associated with a certain RLC entity for the packet duplication bearer is not an SpCell or an associated cell group does not include an SpCell, when an RRC layer receives an indication, from the RLC entity not associated with the SpCell or the RLC entity of which the associated cell group does not include the SpCell, that a maximum number of retransmissions has been reached, the UE considers that an MCG or SCG radio link is unavailable. In this case, the UE may transmit an indication message to a base station through RRC signaling to indicate that the radio link is unavailable or a logical channel corresponding to the RLC entity is unavailable or the RLC entity is unavailable or the cell or cell group associated with the RLC entity is unavailable or the RLC entity reaches the maximum number of retransmissions.

Alternatively, when the RRC entity receives from an MCG RLC entity the indication that the maximum number of retransmissions has been reached, it is considered that a radio link failure of the MCG is detected. If the RLC entity is an RLC entity corresponding to the packet duplication bearer and an associated cell is not a PCell or an associated cell group does not include the PCell, at least one of the following operations is performed: (1) deactivating a PDCP packet duplication function; and (2) the RRC entity transmitting an RRC message (referred to as a radio link failure indication message in the present disclosure) to the base station.

Alternatively, when the RRC entity receives from an SCG RLC entity the indication that the maximum number of retransmissions has been reached, it is considered that a radio link failure of the SCG is detected and an SCG failure information procedure is started to report the SCG radio link failure. If the RLC entity is an RLC entity corresponding to the packet duplication bearer and is associated with an SCell or an associated cell group does not include the pSCell, the SCG failure information procedure includes at least one of the following operations: (1) deactivating a PDCP packet duplication function; (2) transmitting an SCG failure information SCGFailureInformation message and setting a failure type failureType to relevant information for indicating that the RLC of the packet duplication bearer reaches the maximum number of retransmissions (because the RLC entity of the packet duplication bearer reaching the maximum number of retransmissions triggers transmission of the SCG failure information message), where optionally, the SCG failure information message includes a field for indicating a logical channel or packet duplication bearer corresponding to the RLC, for example, the value of the field is a logical channel identity or bearer identifier or RLC identifier; and (3) the RRC entity transmits a radio link failure indication message (which may be an SCG failure information SCGFailureInformation message) to the base station.

Alternatively, for a UE configured with a packet duplication bearer, if a cell associated with an RLC entity for the packet duplication bearer is an SpCell or an associated cell group includes an SpCell, when the RRC layer receives an indication, from the RLC entity associated with the SpCell or the RLC entity of which the associated cell group includes the SpCell, that a maximum number of retransmissions has been reached, it is considered that a radio link failure of an MCG or SCG is detected. Specifically, if a cell associated with an RLC entity for an MCG packet duplication bearer is a PCell or an associated cell group includes a PCell, when an RRC layer receives an indication that the RLC entity associated with the PCell or the RLC entity of which the associated cell group includes the PCell has reached a maximum number of retransmissions, it is considered that a radio link failure of the MCG is detected. If a cell associated with a logical channel for an SCG packet duplication bearer is a PSCell or an associated cell group includes a PSCell, when an RRC entity receives an indication that an RLC entity corresponding to the logical channel associated with the PSCell or the logical channel of which the associated cell group includes the PSCell has reached a maximum number of retransmissions, it is considered that a radio link failure of the SCG is detected.

Alternatively, when the RRC layer receives from an MCG RLC entity the indication that the maximum number of retransmissions has been reached, it is considered that a radio link failure of the MCG is detected. If the RLC entity is an RLC entity corresponding to an MCG packet duplication bearer and an associated cell is a PCell or an associated cell group includes a PCell, at least one of the following operations is performed: (1) storing radio link failure-related information (for example, in a radio link failure information element VarRLF-Report); (2) if access stratum (AS) security is not activated at this time, performing a relevant operation of leaving RRC_CONNECTED; if AS security is activated at this time, starting a connection reestablishment procedure; and (3) starting a connection reestablishment procedure. When the RRC entity receives from an SCG RLC entity the indication that the maximum number of retransmissions has been reached, it is considered that a radio link failure of the SCG is detected. If the RLC entity is an RLC entity corresponding to an SCG packet duplication bearer and an associated cell is a pSCell or an associated cell group includes a pSCell, the following operation is performed: starting an SCG failure information procedure to report an SCG radio link failure. Optionally, the SCG failure information procedure includes at least one of the following operations: (1) deactivating a PDCP packet duplication function; (2) transmitting an SCG failure information SCGFailureInformation message and setting a failure type failureType to a corresponding value for indicating that the RLC of the bearer or the packet duplication bearer reaches the maximum number of retransmissions (because the RLC entity of the packet duplication bearer reaching the maximum number of retransmissions triggers transmission of the SCG failure information message), where optionally, the SCG failure information message includes a field for indicating a logical channel or packet duplication bearer corresponding to the RLC, for example, the value of the field is a logical channel identity or bearer identifier or RLC identifier; and (3) the RRC entity transmits an RRC radio link failure indication message (which may be an SCG failure information SCGFailureInformation message) to the base station.

It should be noted that in the embodiment of the present disclosure, a radio link failure indication message triggered by MCG link unavailability may be different from a radio link failure indication message triggered by SCG link unavailability. If they are different, the radio link failure indication message triggered by MCG link unavailability may be referred to as a first radio link failure indication message; the radio link failure indication message triggered by SCG link unavailability may be referred to as a second radio link failure indication message.

RLC Entity is Associated with Packet Duplication Split Bearer

In this case, the RLC entity is used for an MCG or SCG packet duplication split bearer, and the special cell is a PCell of an MCG or a PSCell of an SCG. In step S520, it is determined that an MCG radio link fails when the cell associated with the RLC entity for the MCG packet duplication split bearer is the PCell or the cell group associated with the RLC entity includes the PCell. Alternatively, it is determined that a radio link associated with the MCG is unavailable when the cell associated with the RLC entity for the MCG packet duplication split bearer is a secondary cell (SCell) or the cell group associated with the RLC entity does not include the PCell. Alternatively, it is determined that an SCG radio link fails when the cell associated with the RLC entity for the SCG packet duplication split bearer is the PSCell or the cell group associated with the RLC entity includes the PSCell. Alternatively, it is determined that a radio link associated with the SCG is unavailable when the cell associated with the RLC entity for the SCG packet duplication split bearer is the SCell or the cell group associated with the RLC entity does not include the PSCell.

The discussion may be carried out in the following situations.

(1) For example, if an RLC entity corresponding to the MCG indicates to an upper layer that a maximum number of retransmissions is reached, and the RLC entity (or logical channel corresponding to the RLC entity) is associated with a PCell or an associated cell group includes a PCell, when an RRC layer receives the indication that the RLC entity corresponding to the logical channel associated with the PCell or the logical channel of which the associated cell group includes the PCell has reached the maximum number of retransmissions, it is considered that a radio link failure of the MCG is detected.

Alternatively, if an RLC entity corresponding to the MCG indicates to an upper layer that a maximum number of retransmissions is reached, it is considered that a radio link failure of the MCG is detected. If the RLC entity is an RLC entity corresponding to a packet duplication split bearer and an associated cell is a PCell or an associated cell group includes a PCell, at least one of the following operations is performed: (1) storing radio link failure-related information (for example, in a radio link failure information element VarRLF-Report); (2) if access stratum (AS) security is not activated at this time, performing a relevant operation of leaving RRC_CONNECTED; if AS security is activated at this time, starting a connection reestablishment procedure; and (3) starting a connection reestablishment procedure.

(2) If an RLC entity corresponding to the MCG indicates to an upper layer that a maximum number of retransmissions is reached, and the RLC entity (or logical channel corresponding to the RLC entity) is associated with an SCell or an associated cell group does not include a PCell, when an RRC layer receives the indication that the RLC entity corresponding to the logical channel associated with the SCell or the logical channel of which the associated cell group does not include the PCell has reached the maximum number of retransmissions, the UE considers that radio link unavailability of the MCG is detected. In this case, the UE may transmit an indication message to a base station through RRC signaling to indicate that the radio link is unavailable or the logical channel corresponding to the RLC entity is unavailable or the RLC entity is unavailable or the cell or cell group associated with the RLC entity is unavailable or the RLC entity reaches the maximum number of retransmissions.

Alternatively, if an RLC entity corresponding to the MCG indicates to an upper layer that a maximum number of retransmissions is reached, it is considered that a radio link failure of the MCG is detected. If the RLC entity is an RLC entity corresponding to a packet duplication split bearer and is associated with an SCell or an associated cell group does not include a PCell, at least one of the following operations is performed: (1) deactivating a PDCP packet duplication function; and (2) the RRC entity transmitting an RRC message (referred to as a radio link failure indication message in the present disclosure) to the base station.

(3) If an RLC entity corresponding to the SCG indicates to an upper layer that a maximum number of retransmissions is reached, and the RLC entity (or logical channel corresponding to the RLC entity) is associated with a PSCell or an associated cell group includes a PSCell, when an RRC layer receives the indication that the RLC entity corresponding to the logical channel associated with the PSCell or the logical channel of which the associated cell group includes the PSCell has reached the maximum number of retransmissions, it is considered that a radio link of the SCG fails.

Alternatively, if an RLC entity corresponding to the SCG indicates to an upper layer that a maximum number of retransmissions is reached, it is considered that a radio link failure of the SCG is detected and an SCG failure information procedure is started to report the SCG radio link failure. If the RLC entity is an RLC entity corresponding to a packet duplication split bearer and an associated cell is a PSCell or an associated cell group includes a PSCell, the SCG failure information procedure includes at least one of the following operations: (1) suspending SCG transmission of the corresponding packet duplication split bearer or suspending SCG transmission of all packet duplication split bearers; (2) transmitting an SCG failure information SCGFailureInformation message and setting a failure type failure Type to a corresponding value for indicating that the RLC of the packet duplication bearer or packet duplication split bearer reaches the maximum number of retransmissions (because the RLC entity of the packet duplication split bearer reaching the maximum number of retransmissions triggers transmission of the SCG failure information message), where optionally, the SCG failure information message includes a field for indicating the RLC entity or a logical channel corresponding to the RLC entity or the packet duplication split bearer corresponding to the RLC entity, for example, the value of the field is an RLC entity identifier or logical channel identity or bearer identifier. If the RLC entity is an RLC entity corresponding to a packet duplication split bearer and an associated cell is a PSCell or an associated cell group includes a PSCell, the following operation is performed: reporting radio link failure information, for example, starting an SCG failure information procedure to report an SCG radio link failure.

(4) If an RLC entity corresponding to the SCG indicates to an upper layer that a maximum number of retransmissions is reached, and the RLC entity (or logical channel corresponding to the RLC entity) is associated with an SCell or an associated cell group does not include a PSCell, when an RRC layer receives the indication that the RLC entity corresponding to the logical channel associated with the SCell or the logical channel of which the associated cell group does not include the PSCell has reached the maximum number of retransmissions, the UE considers that a radio link of the SCG is unavailable. In this case, the UE may transmit an indication message to a base station through RRC signaling to indicate that the radio link is unavailable or the logical channel corresponding to the RLC entity is unavailable or the RLC entity is unavailable or the cell or cell group associated with the RLC entity is unavailable or the RLC entity reaches the maximum number of retransmissions.

Alternatively, if an RLC entity corresponding to the SCG indicates to an upper layer that a maximum number of retransmissions is reached, it is considered that a radio link failure of the SCG is detected and an SCG failure information procedure is started to report the SCG radio link failure. If the RLC entity is an RLC entity corresponding to a packet duplication split bearer and is associated with an SCell or an associated cell group does not include a PSCell, the SCG failure information procedure includes at least one of the following operations: (1) suspending SCG transmission of the corresponding packet duplication split bearer or suspending SCG transmission of all packet duplication split bearers; (2) transmitting an SCG failure information SCGFailureInformation message and setting a failure type failureType to relevant information for indicating that the RLC of the packet duplication bearer or packet duplication split bearer reaches the maximum number of retransmissions (because the RLC entity of the packet duplication split bearer reaching the maximum number of retransmissions triggers transmission of the SCG failure information message), where optionally, the SCG failure information message includes a field for indicating the RLC entity or a logical channel corresponding to the RLC or the packet duplication split bearer corresponding to the RLC entity, for example, the value of the field is an RLC entity identifier or logical channel identity or bearer identifier.

In one example, the RLC entity is used for an MCG or SCG packet duplication bearer. When it is detected that all RLC entities associated with the MCG or SCG packet duplication bearer have reached the predetermined maximum number of retransmissions, in step S520, it is determined that an MCG or SCG radio link fails. Alternatively, the RLC entity is used for an MCG or SCG packet duplication split bearer, where when it is detected that all RLC entities associated with the MCG or SCG packet duplication split bearer have reached the predetermined maximum number of retransmissions, in step S520, it is determined that MCG and SCG radio links fail.

For example, for UE configured with an MCG or SCG packet duplication bearer, if RRC receives indication information of all associated RLC entities that a maximum number of retransmissions is reached, the UE considers that an MCG or SCG radio link fails. For UE configured with a packet duplication split bearer, if RRC receives indication information of all associated RLC entities that a maximum number of retransmissions is reached, the UE considers that MCG and SCG radio links fail.

When it is determined that the radio link associated with the RLC entity is unavailable in step S520, the method 500 further includes: deactivating Packet Data Convergence Protocol (PDCP) packet duplication, and transmitting a PDCP protocol data unit (PDU) to another RLC entity different from the RLC entity in RLC entities used in the PDCP packet duplication, without triggering radio resource control (RRC) connection reestablishment caused by a radio link failure; or an RRC layer suspending the packet duplication bearer or packet duplication split bearer corresponding to the RLC entity.

Specifically, the deactivating PDCP packet duplication may be performed on a PDCP layer in response to an indication that the RLC entity has reached the predetermined maximum number of retransmissions. Alternatively, the deactivating PDCP packet duplication is performed on an RRC layer in response to an indication that the RLC entity has reached the predetermined maximum number of retransmissions, or the suspending the packet duplication bearer or packet duplication split bearer corresponding to the RLC entity is performed on the RRC layer in response to an indication that the RLC entity has reached the predetermined maximum number of retransmissions.

For example, for UE configured with a packet duplication bearer or packet duplication split bearer, optionally, when the RLC entity corresponding to the logical channel not associated with the SpCell (in other words, associated with the SCell) or the logical channel of which the associated cell group does not include the SpCell has reached a maximum number of retransmissions, a PDCP layer or RRC layer is instructed to deactivate PDCP packet duplication or PDCP is instructed to transmit PDCP PDUs to only another RLC entity or the PDCP entity is instructed to not transmit PDCP PDUs to the RLC entity that reaches the maximum number of retransmissions. Alternatively, when the RRC layer receives the indication, of the RLC entity corresponding to the logical channel not associated with the SpCell or the logical channel of which the associated cell group does not include the SpCell, that the maximum number of retransmissions has been reached, PDCP packet duplication is deactivated, or the PDCP entity is instructed to deactivate PDCP packet duplication or PDCP is instructed to transmit PDCP PDUs to only another RLC entity or the PDCP entity is instructed to not transmit PDCP PDUs to the RLC entity that reaches the maximum number of retransmissions.

In one embodiment, the aforementioned indication information may indicate that the cell or cell group that has reached the maximum number of retransmissions or that is associated has a radio link unavailable. The base station can learn, according to the indication information, that the cell that has reached the maximum number of retransmissions or that is associated with the logical channel of the packet duplication bearer and is not the SpCell (in other words, the logical channel is associated with the SCell) or the associated cell group not including the SpCell has a radio link unavailable.

In another embodiment, the indication message further indicates a cell or cell group corresponding to the unavailable radio link. For example, the indication message carries a packet duplication bearer identifier or packet duplication split bearer identifier or indicates corresponding RLC entity information or a logical channel identity corresponding to the logical channel that is associated with the cell being not the SpCell or associated with the cell group not including the SpCell or information for indicating the failed cell or cell group (for example, an identifier of an unavailable cell or cell group), so that the base station can learn that a cell or cell group associated with a logical channel of which packet duplication bearer or packet duplication split bearer has a radio link unavailable or reaches the maximum number of retransmissions. After receiving the message, the base station may transmit an RRC reconfiguration message to the UE.

The deactivating packet duplication (also referred to as PDCP packet duplication or packet duplication of a packet duplication bearer or PDCP PDU duplication or PDCP SDU duplication or PDCP duplication or PDCP duplication of a packet duplication bearer or PDCP PDU duplication of a packet bearer or PDCP SDU duplication of a packet bearer) in the present disclosure may also be expressed as configuring a PDCP entity to transmit the same PDCP PDU to one of two or more associated lower-layer entities (or RLC entities and/or logical channels), or to transmit all PDCP PDUs through only one of two or more lower-layer entities (or RLC entities and/or logical channels), for example, through an RLC entity having an available radio link. The packet duplication in the present disclosure refers to uplink packet duplication.

Figure 6:
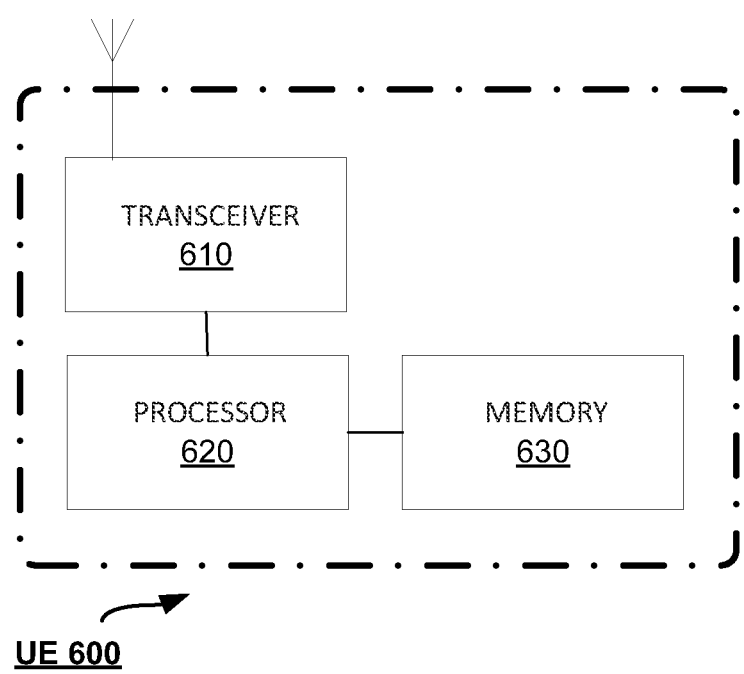
FIG. 6 is a block diagram of user equipment according to an embodiment of the present disclosure.

In accordance with the method 500 described above, the present disclosure provides user equipment (UE). FIG. 6 is a block diagram of UE 600 according to an embodiment of the present disclosure. As shown in the figure, the UE 600 includes a transceiver 610, a processor 620, and a memory 630, the processor 630 storing instructions executable by the processor 620 so that the user equipment 600 performs the method 500 described above with reference to FIG. 5.

Specifically, the processor 630 stores instructions executable by the processor 620 so that the UE 600 detects that a radio link control (RLC) entity associated with a packet duplication bearer or packet duplication split bearer has reached a predetermined maximum number of retransmissions; and the UE 600 determines that a radio link associated with the RLC entity is unavailable or fails based on whether a cell associated with the RLC entity is a special cell (SpCell) or whether a cell group associated with the RLC entity includes an SpCell.

In one example, the RLC entity is associated with the packet duplication bearer, and the determining includes: determining that the radio link associated with the RLC entity is unavailable when the cell associated with the RLC entity is not the special cell (SpCell) or the cell group associated with the RLC entity does not include the SpCell. Alternatively, it is determined that the radio link associated with the RLC entity fails when the cell associated with the RLC entity is the special cell (SpCell) or the cell group associated with the RLC entity includes the SpCell.

In one example, the RLC entity is used for a master cell group (MCG) or secondary cell group (SCG) packet duplication bearer, the special cell is a primary cell (PCell) of an MCG or a primary secondary cell (PSCell) of an SCG, and the determining includes: determining that a radio link associated with the MCG is unavailable when the cell associated with the RLC entity for the MCG packet duplication bearer is not the PCell or the cell group associated with the RLC entity does not include the PCell, or determining that a radio link associated with the SCG is unavailable when the cell associated with the RLC entity for the SCG packet duplication bearer is not the PSCell or the cell group associated with the RLC entity does not include the PSCell. Alternatively, it is determined that an MCG radio link fails when the cell associated with the RLC entity for the MCG packet duplication bearer is the primary cell (PCell) or the cell group associated with the RLC entity includes the PCell, or it is determined that an SCG radio link fails when the cell associated with the RLC entity for the SCG packet duplication bearer is the primary secondary cell (PSCell) or the cell group associated with the RLC entity includes the PSCell.

In one example, the RLC entity is used for an MCG or SCG packet duplication split bearer, the special cell is a PCell of an MCG or a PSCell of an SCG, and the determining includes: determining that an MCG radio link fails when the cell associated with the RLC entity for the MCG packet duplication split bearer is the PCell or the cell group associated with the RLC entity includes the PCell. Alternatively, it is determined that a radio link associated with the MCG is unavailable when the cell associated with the RLC entity for the MCG packet duplication split bearer is a secondary cell (SCell) or the cell group associated with the RLC entity does not include the PCell. It is determined that an SCG radio link fails when the cell associated with the RLC entity for the SCG packet duplication split bearer is the PSCell or the cell group associated with the RLC entity includes the PSCell. It is determined that a radio link associated with the SCG is unavailable when the cell associated with the RLC entity for the SCG packet duplication split bearer is the SCell or the cell group associated with the RLC entity does not include the PSCell.

In one example, the RLC entity is used for an MCG or SCG packet duplication bearer, where when it is detected that all RLC entities associated with the MCG or SCG packet duplication bearer have reached the predetermined maximum number of retransmissions, the determining includes: determining that an MCG or SCG radio link fails. Alternatively, the RLC entity is used for an MCG or SCG packet duplication split bearer, where when it is detected that all RLC entities associated with the MCG or SCG packet duplication split bearer have reached the predetermined maximum number of retransmissions, the determining includes: determining that MCG and SCG radio links fail.

In one example, the processor 630 further stores instructions executable by the processor 620 so that the UE 600, when determining that the radio link associated with the RLC entity is unavailable, deactivates Packet Data Convergence Protocol (PDCP) packet duplication, and transmits a PDCP protocol data unit (PDU) to another RLC entity different from the RLC entity in RLC entities used in the PDCP packet duplication, without triggering radio resource control (RRC) connection reestablishment caused by a radio link failure; or suspends the packet duplication bearer or packet duplication split bearer corresponding to the RLC entity.

In one example, the deactivating PDCP packet duplication is performed on a PDCP layer in response to an indication that the RLC entity has reached the predetermined maximum number of retransmissions. Alternatively, the deactivating PDCP packet duplication is performed on an RRC layer in response to an indication that the RLC entity has reached the predetermined maximum number of retransmissions, or the suspending the packet duplication bearer or packet duplication split bearer corresponding to the RLC entity is performed on the RRC layer in response to an indication that the RLC entity has reached the predetermined maximum number of retransmissions.

In one example, the processor 630 further stores instructions executable by the processor 620 so that the UE 600 transmits an indication message to a base station through RRC signaling to indicate that a radio link is unavailable.

In an embodiment, the indication message further indicates a cell or cell group corresponding to the unavailable radio link.

It should be noted that all the examples and content described above with reference to the method 500 are also applicable to the UE 600, which will not be described herein again.

The computer-executable instructions or program running on the device according to the present invention may be a program that enables the computer to implement the functions of the embodiments of the present invention by controlling the central processing unit (CPU). The program or information processed by the program may be stored temporarily in a volatile memory (for example, a random access memory (RAM)), a hard disk drive (HDD), a non-volatile memory (for example, a flash memory), or other memory systems.

The computer-executable instructions or program for implementing the functions of the embodiments of the present invention may be recorded on a computer-readable storage medium. The corresponding functions can be achieved by reading programs recorded on the recording medium and executing them by the computer system. The so-called "computer system" may be a computer system embedded in the device, which may include operating systems or hardware (for example, peripherals). The "computer-readable storage medium" may be a semiconductor recording medium, an optical recording medium, a magnetic recording medium, a short-time dynamic memory program recording medium, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. A method performed by a user equipment (UE), the method comprising:
   causing a Packet Data Convergence Protocol (PDCP) entity of a bearer supporting a packet duplication in a carrier aggregation to submit a duplicate PDCP Protocol Data Unit (PDU) to a plurality of radio link control (RLC) entities, the plurality of RLC entities being associated with one media access control (MAC) entity in the UE;
   causing one of the plurality of RLC entities to indicate, to a radio resource control (RRC) entity that a maximum number of retransmissions has been reached; and
   in response to the RRC entity receiving the indication, making a decision to send, to a base station, and without triggering RRC connection reestablishment caused by a radio link failure, an indication message indicating that the one of the plurality of RLC entities has reached the maximum number of retransmissions, the decision being made if a logical channel mapped to the one of the plurality of RLC entities is associated with one or more secondary cells (SCells) but neither a primary cell (PCell) nor a Secondary Cell Group (SCG) cell the SCG cell being a cell in which the UE is instructed to perform random access when performing an SCG change procedure,
   wherein a logical channel identity of the logical channel is included in the indication message, and
   the one or more SCells are served by the base station.

2. The method according to claim 1, wherein the plurality of RLC entities is associated with a master cell group (MCG) or an SCG.

3. A user equipment (UE), the UE comprising:
   processing circuitry configured to cause a Packet Data Convergence Protocol (PDCP) entity of a bearer supporting a packet duplication in a carrier aggregation to submit a duplicate PDCP Protocol Data Unit (PDU) to a plurality of radio link control (RLC) entities, the plurality of RLC entities being associated with one media access control (MAC) entity in the UE, and
   sending circuitry, wherein
   the processing circuitry is further configured to cause, one of the plurality of RLC entities to indicate, to a radio resource control (RRC) entity that a maximum number of retransmissions has been reached,
   in response to the RRC entity receiving the indication, the sending circuitry is configured to make a decision to send, to a base station, and without triggering RRC connection reestablishment caused by a radio link failure, an indication message indicating that the one of the plurality of RLC entities has reached the maximum number of retransmissions, the decision being made if a logical channel mapped to the one of the plurality of RLC entities is associated with one or more secondary cells (SCells) but neither a primary cell (PCell) nor a Secondary Cell Group (SCG) cell, the SCG cell being a cell in which the UE is instructed to perform random access when performing an SCG change procedure,
   a logical channel identity of the logical channel is included in the indication message, and
   the one or more SCells are served by the base station.

4. The UE according to claim 3, wherein the plurality of RLC entities is associated with a master cell group (MCG) or an SCG.

* * * * *